United States Patent
Huang et al.

(10) Patent No.: US 10,932,468 B2
(45) Date of Patent: Mar. 2, 2021

(54) BACTERIA WITH 1-AMINOCYCLOPROPANE-1-CARBOXYLIC ACID (ACC) DEAMINASE FOR PROMOTING TURFGRASS GROWTH

(71) Applicant: RUTGERS, THE STATE UNIVERSITY OF NEW JERSEY, New Brunswick, NJ (US)

(72) Inventors: Bingru Huang, East Brunswick, NJ (US); Ning Zhang, East Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 523 days.

(21) Appl. No.: 15/510,424

(22) PCT Filed: Sep. 11, 2015

(86) PCT No.: PCT/US2015/049563
§ 371 (c)(1),
(2) Date: Mar. 10, 2017

(87) PCT Pub. No.: WO2016/040729
PCT Pub. Date: Mar. 17, 2016

(65) Prior Publication Data
US 2017/0280729 A1    Oct. 5, 2017

Related U.S. Application Data

(60) Provisional application No. 62/049,047, filed on Sep. 11, 2014.

(51) Int. Cl.
*A01N 63/00* (2020.01)
*A01N 63/10* (2020.01)

(52) U.S. Cl.
CPC ............ *A01N 63/00* (2013.01); *A01N 63/10* (2020.01)

(58) Field of Classification Search
CPC ................................ A01N 63/00; A01N 63/02
See application file for complete search history.

(56) References Cited

FOREIGN PATENT DOCUMENTS

WO    WO-2013090628 A1 *  6/2013    ............. A01N 63/00

OTHER PUBLICATIONS

Sun, Yili (2008) The role of ACC deaminase in plant growth promotion by the endophytic bacterium Bhurholderia phytofirmaqns PsJN. Masters Thesis. University of Waterloo. Waterloo, Ontario, Canada. (https://uwspace.uwaterloo.ca/handle/10012/3832) (Year: 2008).*
Alshammary, S.F. et al., "Growth response of four turfgrass species to salinity", Agricultural Water Management, 66: 97-111 (2004).
Bhusan Bal, H. et al., "Isolation of ACC deaminase producing PGPR from rice rhizosphere and evaluating their plant growth promoting activity under salt stress", Plant Soil, 366: 93-105 (2013).
Cheng, Z. et al., "1-Aminocyclopropane-1-carboxylate deaminase from Pseudomonas putida UW4 facilitates the growth of canola in the presence of salt", Can. J. Microbiol, 53: 912-918 (2007).
Glick, Bernard R. et al., "Genetic Manipulation of Plant Growth-Promoting Bacteria to Enhance Biocontrol of Phytopathogens", Biotechnology Advances, 15(2): 353-378 (1997).
Saleem, M. et al., "Perspective of plant growth promoting rhizobacteria (PGPR) containing ACC deaminase in stress agriculture", J. Ind. Microbiol. Biotechnol., 34: 635-648 (2007).
Shaharoona, B. et al., "Effectiveness of Various *Pseudomonas* spp. and Burkholderia caryophylli Containing ACC-Deaminase for Improving Growth and Yield of Wheat (Tricicum aestivum L.)", J. Microbiol. Biotechnol., 17(8): 1300-1307 (2007).
Siddikee, A. et al., "Enhancement of growth and salt tolerance of red pepper seedlings (Capsicum annuum L.) by regulating stress ethylene synthesis with halotolerant bacteria containing 1-aminocyclopropane-1-carboxylic acid deaminase activity", Plant Physiology and Biochemistry, 49: 427-434 (2011).
Glick, B.R., "Bacterial ACC deaminase and the alleviation of plant stress", Advances in Applied Microbiology, 56: 291-312 (2004).

* cited by examiner

*Primary Examiner* — Robert J Yamasaki
(74) *Attorney, Agent, or Firm* — Howson & Howson, LLP; Kathleen D. Rigaut

(57) ABSTRACT

Compositions and methods for enhancing turfgrass quality and resistance to adverse abiotic conditions are disclosed.

20 Claims, 8 Drawing Sheets

Figure 8
Burkholderia gladioli BSR3 ACC Deaminase Gene sequence

From: GenBank: CP002600.1

```
atgaaccttcagaaattcccgcgttaccccctgaccttcggcccgacgccgatccagcc
gctcaagcgcctgagcgcccatctcggcggcaaggtcgagctgttcgccaagcgcgagg
attgcaacagcggcctggccttcggcggcaacaagacccgcaagctcgaatacctgatt
cccgacgtggtcgcgcagggcgccgatacgctggtctcgatcggcggcgtgcagtcgaa
ccagacgcgccaggtggcggcggtggccgcgcacctcggcatgaagtgcgtgctggtgc
aggagaactgggtcaactactcggacgcggtatatgaccgggtcggcaatatccagatg
tcgcgcatgatgggcgccgacgtgcggctggtgccggacggcttcgatatcggcatccg
caggagctgggaggaggcgatggccgacgtgcgcgccaagggcggcaagccctatccga
tcccggccggctgctccgagcatccgctgggcggcctgggcttcgtcggcttcgccgag
gaagtgcgcgcgcaggaagccgagatgggcatccgcttcgactacatcgtggtctgttc
ggtgacgggcagcacgcaggccggcatggtggtgggcttcgccgccgacggccgcgccg
atcgcgtgatcggcatcgacgcctcggccaagccggcgcagacgcgcgaacagatcctg
cgcatcgcgcgcggcaccgccgatcgcgtcgagctgggccgcgatatcaccgaagccga
cgtggtgctcgacgaacgcttcggcggccccgaatacggcctgcccagcgagggcacgc
tggaggcgatccggctgtcggcgaggttcgagggcatgctgaccgatcccgtctacgag
ggcaagtcgatgcacggcatgatcgagaaggtgcggctcggcgagttcccggccggctc
caaggtgctctatgcgcacctgggcggcgtgccggcgctgagcgcctacagctacctgt
tccgcgagggttga
```

BACTERIA WITH 1-AMINOCYCLOPROPANE-1-CARBOXYLIC ACID (ACC) DEAMINASE FOR PROMOTING TURFGRASS GROWTH

This application is a § 371 application of PCT/US2015/049563, filed Sep. 11, 2015, which in turn claims priority to U.S. Provisional Application No. 62/049,047 filed Sep. 11, 2014, the entire disclosure being incorporated herein by reference as though set forth in full.

FIELD OF THE INVENTION

This invention is useful for enhancing turfgrass seedling establishment, quality, and resistance to adverse abiotic conditions, or the like. More specifically, the present invention provides reagents, methods and kits which facilitate improved grass growth and stress tolerance.

BACKGROUND OF THE INVENTION

Several publications and patent documents are referenced throughout this application in order to more fully describe the state of the art to which this invention pertains. The disclosure of each of these publications and patent documents is incorporated by reference herein.

Beneficial bacterial endophytes have the ability to alleviate abiotic stresses in combination with plant growth promotion. The enzyme, 1-aminocyclopropane-1-carboxylic acid (ACC) deaminase—produced by certain species of bacteria—utilizes ethylene as a nitrogen source. AAC deaminase is a multimeric enzyme that cleaves the precursor to ethylene, ACC, to α-ketobutyrate and ammonia and thereby decreases ethylene levels in host plants. Ethylene acts as a stress hormone and inhibits plant root growth. Plants infected with ACC-deaminase producing bacteria have less ethylene and thus, exhibit better overall growth.

Salinity is a major stress limiting plant growth in areas with saline soils or irrigated with poor quality water. Salinity stress can impose cellular and physiological damages including osmotic stress, ion toxicity, and nutrient disturbances (Alshammary et al., 2004). Salinity stress may cause changes in hormone metabolism in plants, including the promotion of ethylene production (Morgan and Drew, 1997). Increases in the production of an ethylene precursor, ACC, have been widely reported to be associated with salinity stress in leaves and roots of various plant species (Arbona et al., 2003; Zapata et al., 2004; Ghanem et al., 2008; Gomez-Cadenas et al., 1998; Kukreja et al., 2005). Excessive ethylene in plants exposed to stresses, including salinity stress, adversely affects shoot and root growth, mainly by induction of leaf or root maturation and senescence (Morgan and Drew, 1997; Abeles et al., 2012). Approaches that can suppress excessive accumulation of stress-induced ethylene may be effective to mitigate stress damages.

Revenue from the sale of turfgrass products exceeds one billion dollars per year (6).

Currently, there are limited techniques—both time consuming and cost-intensive—to prevent adverse effects of abiotic stressors on turfgrass growth and durability. Improved methods to protect turfgrass from environmental stresses, such as improving drought and salinity tolerance for the conservation of fresh water and improving heat tolerance for reducing inputs of fertilizers and pesticides are clearly needed. Therefore, improving turfgrass growth and stress tolerance would be an important and financially profitable endeavor.

SUMMARY OF THE INVENTION

In accordance with the present invention a method for enhancing turfgrass growth, quality and resistance to adverse abiotic conditions is provided. In one embodiment, an exemplary method entails colonization of turfgrass plants with ACC-deaminase producing bacterial strains *Burkholderia* and/or *Herbaspirillum*. Improved turfgrass quality can then be assessed under control, drought and salinity conditions. A second exemplary method concerns transformation of other beneficial non-ACC-deaminase producing bacteria with recombinant vectors that express the ACC-deaminase gene. Resulting plants can also be assessed for improved quality under the conditions described above.

The beneficial effects of *Burkholderia* and *Herbaspirillum* colonization on turfgrass quality include without limitation, alterations in total root length, relative water content, electrolyte leakage, root and shoot dry weight, ground cover, turfgrass survival, and plant height as well as visual examination and numeric quality ratings of color, density, uniformity, texture, growth, and resistance to adverse environmental conditions.

In one embodiment the method for enhancing overall growth and resistance to adverse abiotic conditions comprises inoculating a plant with a composition comprising at least one bacterium that expresses the ACC deaminase enzyme which catalyzes ACC to α-ketobutyrate and ammonia, thereby decreasing ethylene levels in said plants and increasing resistance to abiotic stress. Bacteria useful for this purpose include *Burkholderia phytofirman* (PsJN), *Burkholderia gladioli* (RU1), *Herbaspirillum huttiense* (PP19) *Burkholderia phenazinium* (WSF26), *Burkholderia cepacia* (CM2-8), and *Herbaspirillum rhizosphaerae* (PP6). In another approach, the bacteria is a bacterium genetically engineered to express the ACC deaminase enzyme. Turfgrasses to be so treated include without limitation, Ryegrass, Kentucky Bluegrass, Tall Fescue, Creeping Bentgrass, Bermuda, St. Augustine and *Zoysia* plant.

Another aspect of the invention includes a biofertilizer composition comprising an effective amount of at least one ACC deaminase expressing bacteria for promoting plant growth and resistance to abiotic stresses. In one embodiment, the composition contains a mixture of ACC deaminase expressing bacteria in equal concentrations. In yet another embodiment, the composition comprises at least one strain of ACC deaminase producing bacteria, a sun protecting product and a polysaccharide solution. In yet another aspect the bacterial strains are encapsulated in allignate beads.

The following bacterial strains were deposited in accordance with 37 C.F.R.§§ 1.801-1.809:

| Bacterial Strain | Accession Number | Deposit Date | Description |
| --- | --- | --- | --- |
| PP19 | PTA-126848 | Oct. 7, 2020 | *Herbaspirillum huttiense* |
| PP6 | PTA-126851 | Oct. 7, 2020 | *Herbaspirillum rhizosphaerae* |
| RU1 | PTA-126852 | Oct. 7, 2020 | *Burkholderia gladioli* |

All strains are deposited at:
American Type Culture Collection (ATCC)
10801 University Blvd.
Manassas, VA 20110-2209
USA

BRIEF DESCRIPTION OF THE DRAWINGS

FIG. 8. A representative ACC deaminse gene sequence of a *Burkholderia* strain (SEQ ID NO: 1)

DETAILED DESCRIPTION OF THE INVENTION

Figure 1:
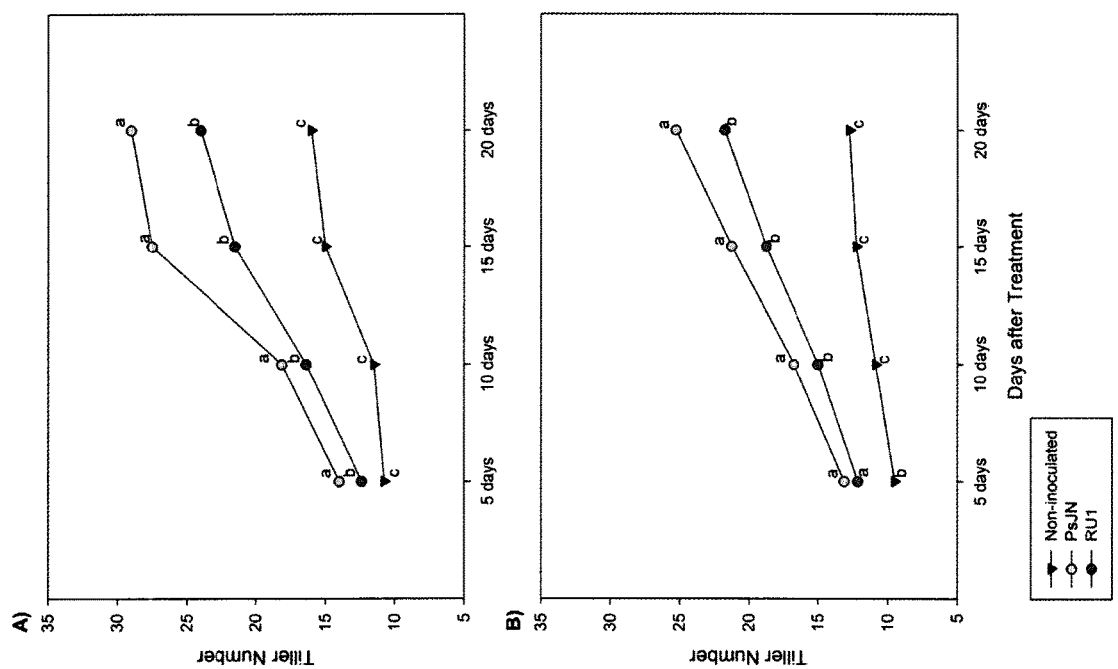
FIGS. 1A-1B. Tiller number of RU1 and PsJN inoculated and non-inoculated perennial ryegrass under non-stressed condition (FIG. 1A) and salinity condition (FIG. 1B). Vertical bars indicate LSD values ($P \leq 0.05$) for comparison between treatments at a given day of treatment where significant differences were detected.

Excessive ethylene production in plant roots exposed to salinity stress can be detrimental to plant growth. In accordance with the present invention, we demonstrate that inoculating roots with bacteria containing deaminase enzymes that break down the ethylene precursor 1-aminocyclopropane-1-carboxylate (ACC) (ACC-deaminase) improves plant tolerance to salinity in perennial ryegrass (*Lolium perenne* L.). We also show that such treatment effectively modulates growth and physiological factors, as well as nutrition status of treated plants relative to untreated controls. Plants of perennial ryegrass (cv. Pangea) were inoculated with either *Burkholderia phytofirmans* PsJN or *B. gladioli* RU1 and irrigated with either fresh water (control) or a 250 mM NaCl solution to induce salinity stress. The bacterium-inoculated plants had less ACC content in shoots and roots under both non-stressed and salinity conditions. Salinity stress inhibited root and shoot growth, but the bacterium-inoculated plants exhibited higher visual turf quality, tiller number, root biomass, shoot biomass, leaf water content and photochemical efficiency, as well as lower cellular electrolyte leakage under salinity stress. Plants inoculated with bacteria had lower sodium content and higher potassium to sodium ratios in shoots under salinity stress. Shoot and root nitrogen content and shoot potassium content increased whereas shoot and root calcium, magnesium, iron, and aluminum content all decreased due to bacterial inoculation under salinity treatment.

We conclude that ACC-deaminase bacteria inoculation of roots was effective in improving salinity tolerance of perennial ryegrass and could be incorporated into turfgrass maintenance programs in salt-affected soils. ACC-deaminase producing bacteria useful in the present invention, include, without limitation, *Burkholderia phytofirmans* (PsJN), *Burkholderia gladioli* (RU1), *Burkholderia phenazinium* (WSF26), *Burkholderia cepacia* (CM2-8), *Herbaspirillum huttiense* (PP19), or *Herbaspirillum rhizosphaerae* (PP6), each of which have advantageous effects on overall turfgrass growth and resistance to adverse abiotic conditions. Turfgrass plants inoculated with these species of bacteria were found to have better growth and quality levels and exhibit enhanced resistance to environmental stressors.

In an aspect of the invention, a kit is provided to facilitate turfgrass growth and resistance to adverse abiotic conditions. Such a kit contains turfgrass seeds and vials containing live or latent cells of efficient strains of ACC-deaminase producing bacteria and instructions for use. In another aspect of the invention, seeds inoculated with ACC-deaminase producing bacteria are provided. In a third aspect of the invention, turfgrass sod inoculated with ACC-deaminase producing bacteria is provided. In a fourth aspect of the invention, a specialized biofertilizer (also called "microbial inoculants") in a liquid formulation containing live or latent cells of efficient strains of ACC-deaminase bacteria are provided for soil drenching at seeding or sodding into mature turfgrass stands to colonize the rhizosphere. In a fifth aspect of the invention, a specialized biofertilizer ("microbial inoculants in a solid formulation containing live or latent cells of efficient strains of ACC-deaminase bacteria is provided, which can be applied to turfgrass by topdressing followed by irrigation into the soil, and colonization of the rhizosphere.

Definitions

An endophyte is an endosymbiont, often a bacterium or fungus, that lives within a plant without causing apparent disease. Endophytes may enhance a plant's growth and improve the plant's ability to tolerate abiotic stresses such as drought or harsh soil conditions. In one embodiment an endophyte useful herein comprises beneficial bacteria comprising one or more of *Burkholderia* spp. and *Herbaspirillum* spp. Suitable species include, without limitation, *Burkholderia phytofirmans* (PsJN), *Burkholderia gladioli* (RU1), *Burkholderia phenazinium* (WSF26), *Burkholderia*

*cepacia* (CM2-8), *Herbaspirillum huttiense* (PP19), or *Herbaspirillum rhizosphaerae* (PP6).

The term "abiotic" herein includes non-living chemical and physical parts of the environment that affect ecosystems. An ecosystem's abiotic factors may be classified via "SWATS" (Soil, Water, Air, Temperature, Sunlight).

The term "salinity" herein refers to soil salinity, which is the salt content in the soil. The excess accumulation of salts, typically most pronounced at the soil surface, can result in salt-affected soils. The consequences of salinity are detrimental effects on plant growth and yield.

The term "ACC deaminase" herein refers to the enzyme, 1-aminocyclopropane-1-carboxylic acid, produced by certain species of bacteria that utilize ethylene as a nitrogen source. ACC deaminase cleaves AAC which is the immediate precursor of ethylene to α-ketobutyrate and ammonia effectively decreasing ethylene levels in host plants.

The term "vector" refers to a double stranded nucleic acid (plasmid) or bacteriophage that contains a double stranded nucleic acid expressing a recombinant gene used for transforming bacteria.

The following materials and methods are provided to facilitate the practice of the present invention.

Plant Materials and Growth Conditions

Perennial ryegrass (cv. Pangea) plants were collected from the turfgrass research farm of Rutgers University at North Brunswick, N.J. Tillers of similar sizes were surface-sterilized by soaking in 1% sodium hypochlorite for 30 seconds then rinsed twice in sterile water. Ten tillers were transplanted into each pot filled with sterile fritted clay (Profile Products, Deerfield, Ill.). Plants were established for 28 d during October in 2013 in a greenhouse with an average day/night temperature of 21/15° C. and 710 µmol m$^{-2}$ s$^{-1}$ photosynthetically active radiations (PAR) from natural sunlight and supplemental lighting. Plants were irrigated daily with sterile water and fertilized weekly with sterile half-strength Hoagland's solution (Hoagland and Arnon, 1950). Following establishment, plants were transferred to growth chambers (Environmental Growth Chamber, Chagrin Falls, Ohio, USA) and allowed to acclimate for 4 days prior to bacterial inoculation and subsequent salinity treatment. The controlled-environment growth chambers were set to maintain 23/18° C. (day/night), 680 µmol m$^{-2}$ s$^{-1}$ PAR, 60% relative humidity, and 12-h photoperiod.

Bacterial Preparation and Inoculation

Two ACC-deaminase producing bacteria species, *Burkholderia phytofirmans* strain PsJN and *B. gladioli* RU1 were used to inoculate perennial ryegrass plants. PsJN has been previously reported having ACC-deaminase activities (Mitter et al., 2013). RU1 is an ACC-deaminase producing strain isolated from the soil established with turfgrass at the research farm of Rutgers University. Bacterial cultures were revived from frozen stock vials stored at −80° C. by streaking on nutrient agar plates. Single colonies were picked and inoculated in lysogeny broth and incubated at 23° C. on a water-bath shaker set at 200 rpm for 48 h. Bacterial suspensions were centrifuged at 8000 g for 10 min at 4° C. then re-suspended in deionized water. The centrifuge and re-suspension process was repeated twice to remove the lysogeny broth. The prepared bacterial suspension was adjusted to OD (optical density) of 1.0. Plants were inoculated by soil drenching with 30 mL prepared bacterial inoculum into each pot twice at an interval of 6 h. The control group for the bacterial inoculation treatment was watered with 30 mL of deionized water.

Salinity Treatment and Experimental Design

Salinity treatment was initiated one day following bacterial inoculation. Plants in each pot received 50 mL sterile NaCl solution daily for the duration of the experiment. NaCl treatment was increased at 2 d intervals from 20, 40, 80, 160, to 250 mM to avoid initial salinity shock. Plants were subjected to 250 mM salinity level for 21 d. The experimental design was completely randomized design with two factors (salinity treatment and bacterial inoculation). Each treatment consisted of four replicates and three subsamples (containers) with a total of 12 containers (multiple plants in each container). Four replicates for each treatment were placed in four different growth chamber, and subsamples or containers of plants were randomly placed inside each growth chamber. Addition, all containers were relocated among four growth chambers every 3 d to avoid possible confounding effects of chamber environmental variations.

Physiological Analyses

Leaf electrolyte leakage (EL) was measured as an indicator of cellular membrane stability according to the procedure by Blum and Ebercon (1981). Approximately 0.2 g fresh leaves were collected, rinsed with deionized water to remove exogenous solutes, and placed in a test tube containing 30 mL deionized water. Tubes were placed on a conical flask shaker for 12 h and the initial conductance ($C_i$) measured using an YSI Model 32 Conductivity Meter (Yellow Spring, Ohio). Leaf samples were killed by autoclaving at 120° C. for 20 min and shaking for 12 h. The maximal conductance of killed tissue ($C_{max}$) was then measured. EL was calculated using the formula (%)=($C_i/C_{max}$)×100.

Relative water content (RWC) was measured according to the procedure by Barrs and Weatherley (1962). Leaf RWC was calculated based on leaf fresh weight (FW), turgid weight (TW), and dry weight (DW) using the formula (%)=[(FW−DW)/(TW−DW)]×100. FW of leaves was determined with a mass balance immediately after detaching leaves from the plant. Samples were then wrapped in tissue paper and submerged in deionized water for 12 h at 4° C. Leaf samples were removed from the water, blotted dry, and again weighed for TW. Following a drying period of three days at 80° C., samples were weighed a final time for DW. Leaf photochemical efficiency was estimated by measuring chlorophyll fluorescence expressed as the ratio of variable to maximum fluorescence ($F_v/F_m$) with a fluorescence induction monitor (OS 1FL, Opti-Sciences, Hudson, N.H.). Leaves were dark adapted for 30 min before $F_v/F_m$ was measured.

ACC Determination

ACC content was determined according to the method of Lizada and Yang (1979). About 0.1 g of fresh leaf tissue was grounded into powder with liquid nitrogen and dissolved in 1.5 mL ethanol. The sample was then centrifuged at 10,000 g for 15 min at 4° C. and the supernatant was evaporated in a vacuum at 50° C. 0.75 mL deionized $H_2O$ and 0.75 mL chloroform was added and the samples were vortexed and centrifuged at 10,000 g for 15 min at 4° C. 0.5 mL of the water phase extract was transferred to glass tube with rubber cap affixed, 10 µL 0.1M $HgCl_2$ was added, and the volume was brought up to 0.8 mL with water. A 0.2 mL ice cold mixture (v/v=2:1) of commercial bleach (8% NaOCl) and saturated NaOH was injected by a syringe and the glass tube was vortexed. Following 3 min incubation on ice, 1 mL air sample was withdrawn using a syringe and injected into a gas chromatograph (GC-8A; Shimadzu Scientific Instruments, Columbia, Md.) (Watkins and Frenkel, 1987).

Shoot and Root Growth Analyses

Visual evaluation of turf quality (TO) was performed biweekly during the salinity treatment. TQ was rated on a scale of 1 to 9, with 1 being brown and desiccated turf, 6 being the minimal acceptable level, and 9 being green and dense turf. Ratings were based on parameters such as uniformity, visual attractiveness, leaf color, and canopy density (Beard, 1973). Tiller density was determined by manually counting the numbers of tillers in each pot every 5 d. Shoot and root dry weights were measured at 10 d and 20 d of salinity treatment. Roots were washed free of fritted clay and severed from shoots. All tissues were dried at 80° C. for three days and weight measured using a mass balance. Root morphological parameters were analyzed upon harvest at 20 d of salinity treatment. Roots were washed free of fritted clay, stained with 1% crystal violet solution, and scanned with a digital scanner (Epson Expression 1680, U.S. Epson, Inc., Long Beach, Calif.) to generate high-definition digital images. Images were analyzed using WinRHIZO Basic V. 2002 software (Regent Instruments Inc., Quebec, QC, Canada) for root length, volume, surface area, and diameter.

Shoot and Root Nutrient Analysis

Roots were washed free of fritted clay and severed from shoots at 20 d after salinity initiation. They were washed with deionized water and dried at 80° C. for 3 days. The dry plant samples were ground with liquid nitrogen and passed through a 2 mm mesh sieve. Approximately 0.2 g samples were analyzed for nutrient content in shoots and roots. Nitrogen content was determined using the combustion method of Horneck and Miller (1998). The content of P, K, Ca, Mg, Mn, Fe, Cu, B, Al, Zn and Na was measured by the dry ash method (Miller, 1998).

Statistical Analysis

Main effects of salinity or bacterial inoculation and their interactions were determined by analysis of variance according to the general linear model procedure of a statistical program (SAS 9.2; SAS Institute, Cary, N.C.). Differences between treatment means were separated by Fisher's protected least significance difference (LSD) test at the 0.05 probability level.

The following examples are provided to illustrate certain embodiments of the invention. They are not intended to limit the invention in any way.

Example I

ACC-Deaminase Containing Bacteria Promote Turfgrass Growth and Resistance to Abiotic Stresses Salinity stress becomes an increasingly significant concern in turfgrass management due to the decline in the availability of fresh water and the increasing use of recycled water for irrigation (Carrow and Duncan, 1998; Pessarakli, 1999). ACC-deaminase bacteria could be potentially useful in turfgrass management programs to combat salinity stress, assuming there exist positive effects for turfgrass. However, effects of ACC-deaminase bacteria on turfgrass growth and salinity tolerance have not been previously reported. Furthermore, limited information is available on physiological factors involved with ACC-deaminase bacteria effects, which deserve investigation. Therefore, in this example, we determined whether ACC-deaminase producing bacteria could promote growth and salinity tolerance for a widely-used turfgrass species, perennial ryegrass (Lolium perenne L.) and investigated physiological effects of ACC-deaminase producing bacteria inoculation on perennial ryegrass responses to salinity stress.

Figure 2:
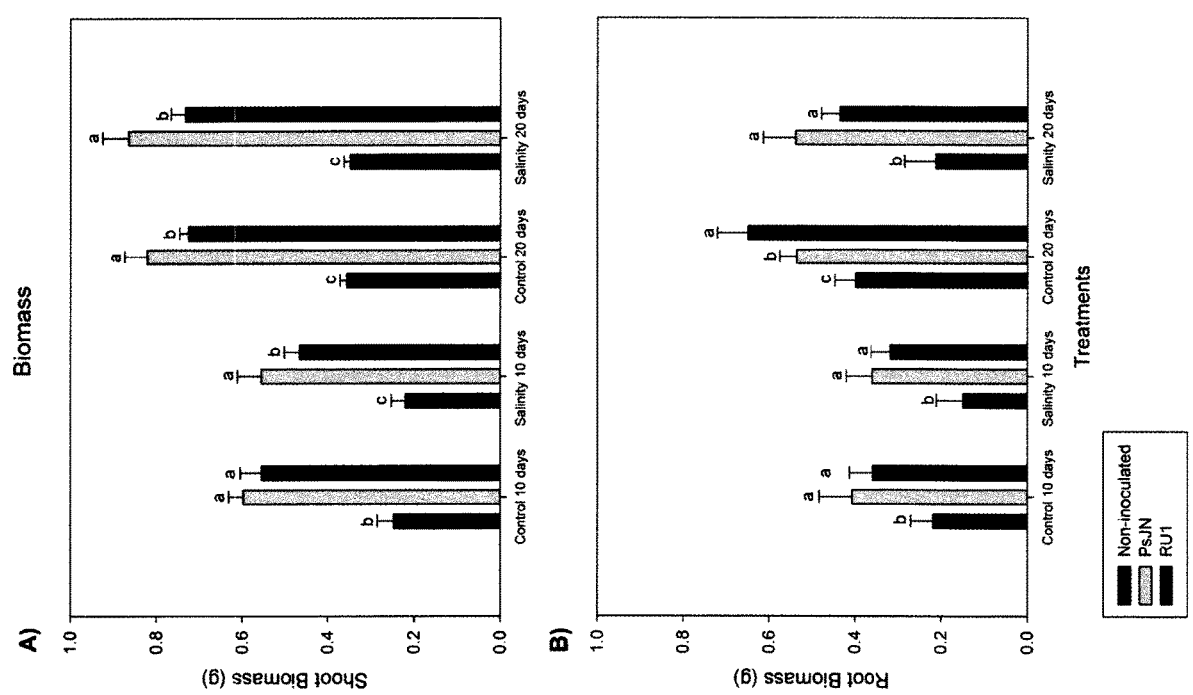
FIGS. 2A-2B. Shoot biomass (FIG. 2A) and root biomass (FIG. 2B) of RU1 and PsJN inoculated and non-inoculated perennial ryegrass at 10 and 20 d of non-stressed and salinity conditions (DAT). Columns marked with different letters indicate significant differences between treatments at $P \leq 0.05$ within each group (non-inoculated, PsJN inoculated, RU1 inoculated).

Shoot and Root Growth as Affected by the Inoculation with ACC-Deaminase Producing Bacteria No significant differences in turf quality were observed between the bacterium-inoculated plants and the non-inoculated plants at either 10 or 20 d of non-stressed conditions (Table 1). Salinity caused significant decrease of turf quality in non-inoculated plants at 10 and 20 d of salinity treatment, and in inoculated plants only at 20 d. Under salinity treatment, a significant increase in TQ (9.7%) was detected in the inoculated plants with both bacteria species at 20 d, compared to TQ of the non-inoculated plants. No significant difference in TQ was observed between the two bacterial treatments under salinity stress. Bacterial inoculation significantly increased the number of tillers under both non-stressed and salinity conditions, but to a greater extent under non-stressed conditions, particularly with PsJN inoculation which was as much as two folds higher than that of the non-inoculated controls (FIG. 1 A, B). Both bacterial inoculations showed significant positive effects on shoot and root biomass accumulation at 10 d and 20 d of salinity stress (more than two folds higher), compared to the non-inoculated plants. Shoot biomass of PsJN-inoculated plants was significantly higher than that of RU1-inoculated plants at 10 d of salinity conditions (18%) and at 20 d of both non-stressed (14%) and salinity conditions (18%) (FIG. 2 A). For root biomass, the difference between PsJN and RU1 inoculation was not significant at 10 d of both non-stressed and salinity conditions and at 20 d of salinity conditions. At 20 d, root biomass of PsJN-inoculated plants was significantly lower (21%) than that of RU1-inoculated plants under non-stressed conditions (FIG. 2 B).

Figure 3:
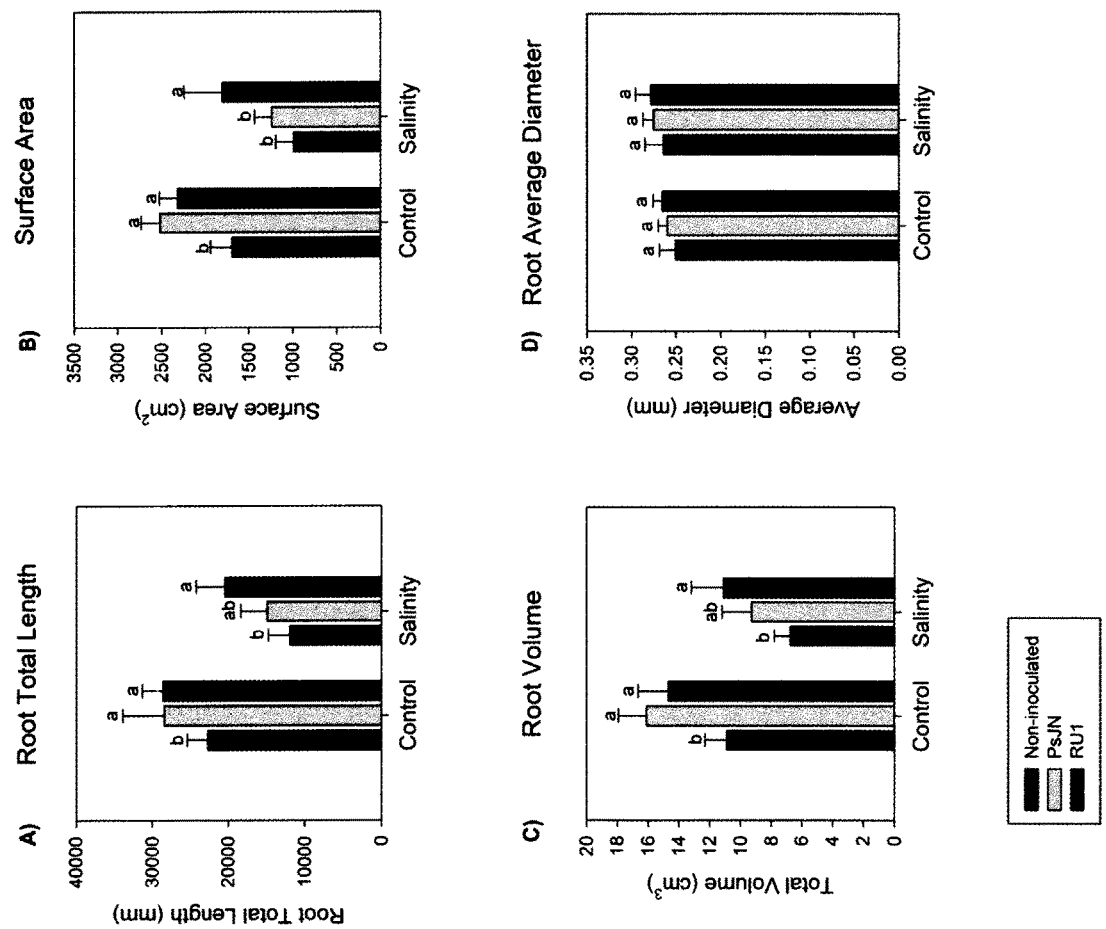
FIGS. 3A-3D. Root total length (FIG. 1A), root surface area (FIG. 1B), root volume (FIG. 1C), root average diameter (FIG. 1D) of RU1, PsJN inoculated and non-inoculated perennial ryegrass under non-stressed and salinity conditions. Columns marked with different letters indicate significant differences between treatments at $P \leq 0.05$ within each group (non-inoculated, PsJN inoculated, RU1 inoculated).

Both bacterial treated plants had significantly higher root length (25% for both inoculants) and root volume (34% and 45% for RU1 and PsJN, respectively) under non-stressed conditions. Under salinity condition the difference was significant only between RU1-inoculated and the non-inoculated control, but not between PsJN and its non-inoculated control (FIG. 3 A, C). Both bacterial species increased root surface area under non-stressed conditions (36% and 48% for RU1 and PsJN, respectively), and only RU1 inoculation significantly increased root surface area (80%) under salinity conditions (FIG. 3 B). No difference in root diameter was observed among bacterial treatments and the non-inoculated control under both non-stressed and salinity conditions (FIG. 3 D).

TABLE 1

Effects of bacterial inoculation on turf quality of perennial ryegrass at 0, 10 and 20 d of non-stressed or salinity treatment. Values are means of four replicates. Values with the same letter within each column indicated no significant difference based on LSD test at p = 0.05.

| Treatment | 0 d | 10 d | 20 d |
| --- | --- | --- | --- |
| Watered | $9.0^a$ | $9.0^a$ | $7.8^b$ |
| Watered + PsJN | $9.0^a$ | $8.8^{ab}$ | $8.0^{ab}$ |
| Watered + RU1 | $9.0^a$ | $8.9^{ab}$ | $8.3^a$ |
| Salinity | $9.0^a$ | $8.5^c$ | $6.2^d$ |
| Salinity + PsJN | $9.0^a$ | $8.8^{abc}$ | $6.8^c$ |
| Salinity + RU1 | $9.0^a$ | $8.5^{bc}$ | $6.8^c$ |

Physiological Effects of the Inoculation with ACC-Deaminase Producing Bacteria

Figure 4:
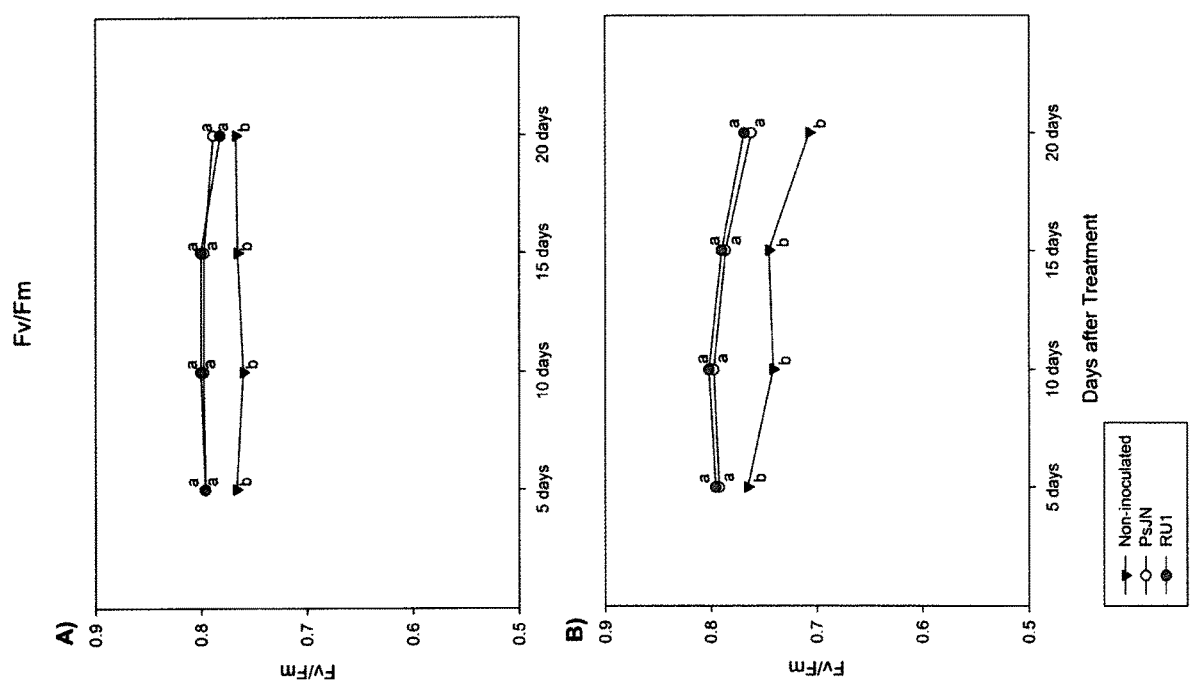
FIGS. 4A-4B. Leaf photochemical efficiency ($F_v/F_m$) of RU1 and PsJN inoculated and non-inoculated perennial ryegrass under non-stressed condition (FIG. 1A) and salinity condition (FIG. 1B). Vertical bars indicate LSD values ($P \leq 0.05$) for comparison between treatments at a given day of treatment where significant differences were detected.

Leaf photochemical efficiency declined under salinity conditions (FIG. 4 B). Both bacterial inoculated plants had higher Fv/Fm under both non-stressed and salinity conditions compared to the non-inoculated control plants. No significant differences existed between the two bacterial inoculations under either non-stressed or salinity conditions (FIG. 4 A, B).

Figure 5:
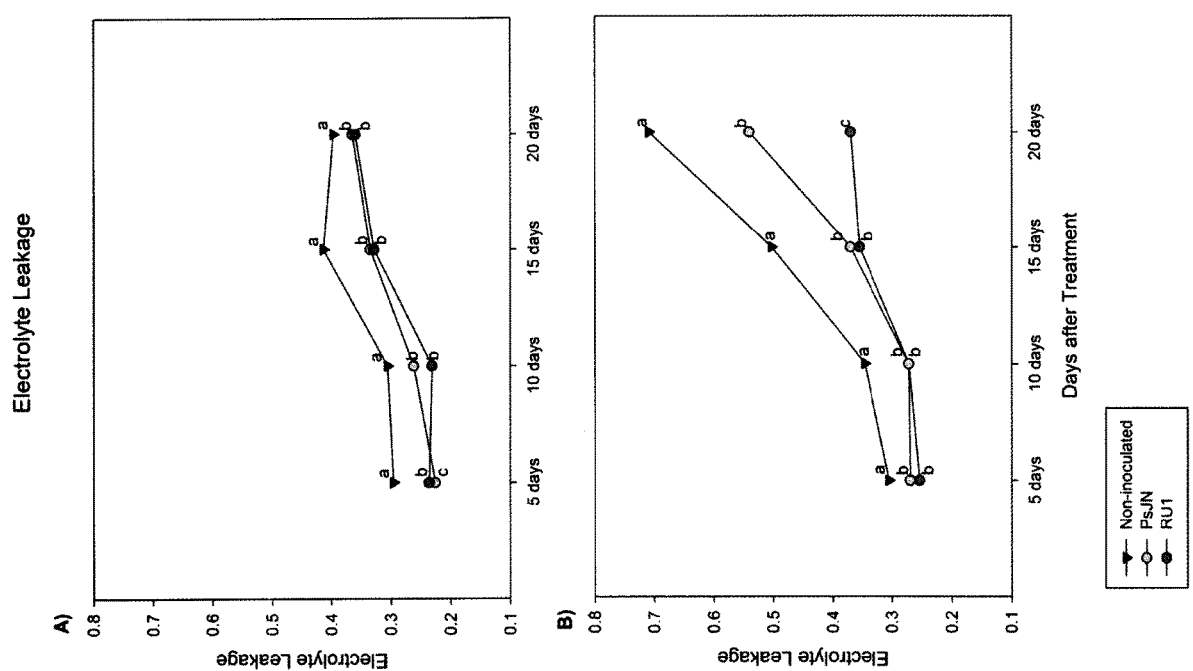
FIGS. 5A-5B. Electrolyte leakage (EL) of RU1 and PsJN inoculated and non-inoculated perennial ryegrass under non-stressed condition (FIG. 5A) and salinity condition (FIG. 5B). Vertical bars indicate LSD values ($P \leq 0.05$) for comparison between treatments at a given day of treatment where significant differences were detected.

Leaf EL was lower in bacterial inoculated plants than the non-inoculated plants under either non-stressed or salinity conditions (FIG. 5 A, B). There was no difference in leaf EL between plants inoculated with the two bacteria species under non-stressed conditions (FIG. 5 A). After 15 d of salinity treatment, EL of PsJN-inoculated plants was significantly higher than RU1-inoculated plants (FIG. 5 B).

Figure 6:
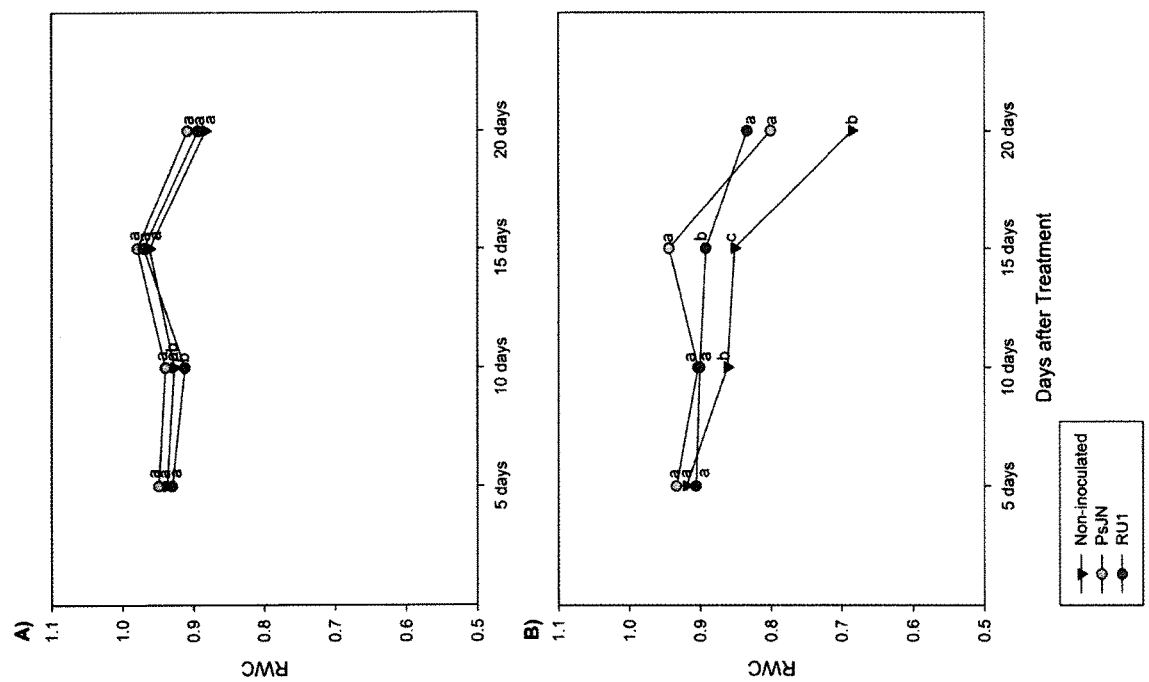
FIGS. 6A-6B. Relative water content (RWC) of RU1 and PsJN inoculated and non-inoculated perennial ryegrass under non-stressed condition (FIG. 6A) and salinity condition (FIG. 6B). Vertical bars indicate LSD values ($P \leq 0.05$) for comparison between treatments at a given day of treatment where significant differences were detected.

Under non-stressed conditions, RWC remained around 90% and no significant differences existed among bacteria-inoculated plants and non-inoculated control plants (FIG. 6 A). Under salinity conditions, RWC of the non-inoculated plants were significantly lower than that of plants inoculated with either bacteria strain (FIG. 6 B). There was no significant difference in RWC between the two bacteria species inoculations during most of the treatment period under salinity conditions.

Figure 7:
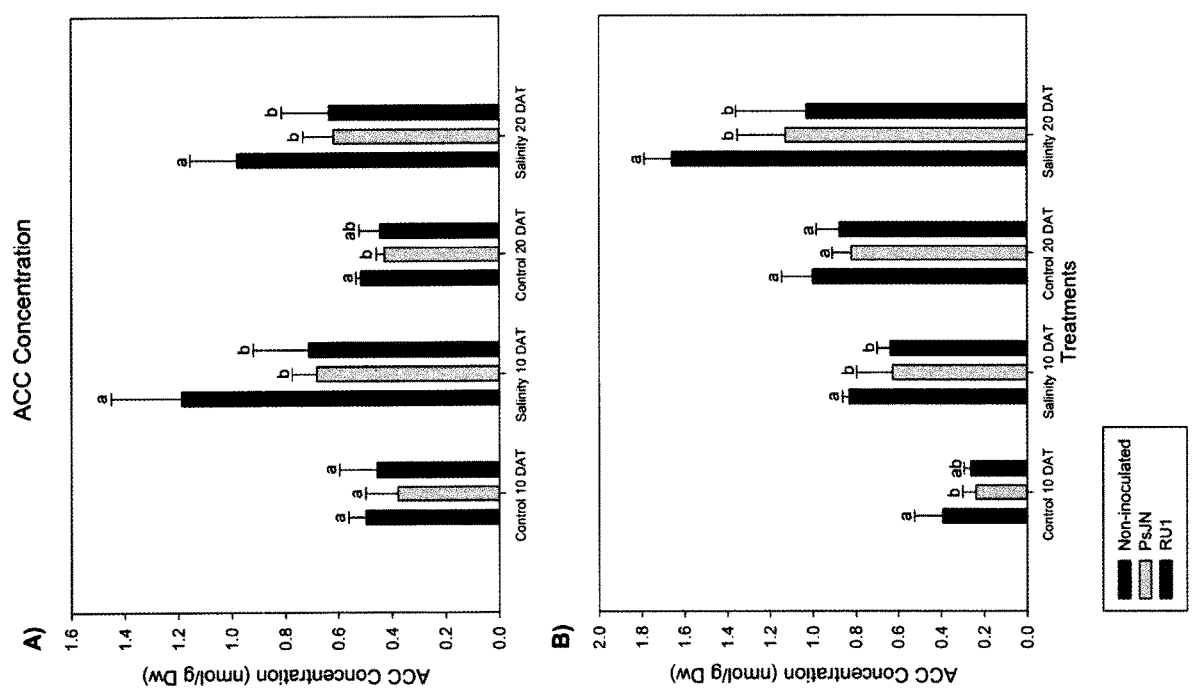
FIGS. 7A-7B. Shoot ACC content (FIG. 7A) and root ACC content (FIG. 7B) of RU1, PsJN inoculated and non-inoculated perennial ryegrass under non-stressed and salinity conditions. Columns marked with different letters indicate significant differences between treatments at $P \leq 0.05$ within each group (non-inoculated, PsJN inoculated, RU1 inoculated).

Both shoot and root ACC contents under salinity treatment were higher (up to two folds) than those of the non-stressed plants (FIG. 7 A, B). Shoot ACC content was significantly lower (20%) in plants inoculated with PsJN at 20 d of non-stressed conditions (FIG. 7 A). Under salinity conditions, shoot ACC contents were significantly lower (40% and 36% for RU1 treatments at 10 d and 20 d, respectively; 43% and 38% for PsJN treatments at 10 d and 20 d, respectively) in the two bacteria-treated plants than in the non-inoculated plants (FIG. 7 A). No significant difference in shoot ACC content was detected between plants inoculated with the two bacteria species under salinity conditions (FIG. 7 A). In root tissues (FIG. 7 B), the ACC content was not significantly affected by bacteria inoculation under non-stressed conditions. Under salinity conditions, root ACC content of PsJN- or RU1-inoculated plants was significantly lower (23% and 38% for RU1 treatments at 10 d and 20 d, respectively; 24% and 32% for PsJN treatments at 10 d and 20 d, respectively) than that in the non-inoculated plants. Plants inoculated with the two bacteria species had no significance differences in root ACC content under either non-stressed or salinity conditions (FIG. 7 B).

Shoot and Root Nutrient Status as Affected by the Inoculation with ACC-Deaminase Producing Bacteria The content of Na in shoot tissues increased dramatically under salinity treatment in both shoots (from 0.08% to 3.98%) and roots (from 0.14% to 0.38%) of the control plants (Table 2). In bacterial inoculated plants, a significant lower Na content was observed in shoot tissues under both non-stressed (50% and 37% lower for RU1 and PsJN, respectively) and salinity conditions (77% and 55% lower for RU1 and PsJN, respectively), compared to that in the non-inoculated plants. No significant difference in root Na content was detected between bacteria-inoculated and non-inoculated plants under salinity conditions. For K content, shoots of both inoculated plants had higher levels than the non-inoculated plants under both non-stressed (127% and 140% for PsJN and RU1, respectively) and salinity conditions (147% and 154% for PsJN and RU1, respectively) (Table 2). Roots of PsJN treated plants had higher K content (44%) than the non-inoculated plants under salinity conditions (Table 2). Bacteria-inoculated plants had greater K/Na ratio in shoots under both non-stressed (2.7 and 2.2 folds for RU1 and PsJN, respectively) and salinity conditions (6.7 and 3.3 folds for RU1 and PsJN, respectively).

The inoculation of plants with two bacterial species had differential effects on macronutrients and micronutrients under non-stressed and salinity conditions. For N content, there was a significant increase in both shoots (14% and 21% for RU1 under non-stressed and salinity condition, respectively; 15% and 20% for PsJN under non-stressed and salinity condition, respectively) and roots (12% and 17% for RU1 under non-stressed and salinity condition, respectively; 22% and 23% for PsJN under non-stressed and salinity condition, respectively) in the inoculated plants compared to the non-inoculated plants under either non-stressed or salinity conditions (Table 3). No effects of bacterial inoculation were observed on shoot and root P content under either non-stressed or salinity conditions (Table 3). For Ca and Mg content, the effect of bacterial inoculation only showed significance under salinity conditions with significantly lower content in bacterial inoculated plants compared with the non-inoculated plants in both shoots (31% and 25% lower for RU1 in Ca and Mg content, respectively; 22% and 14% lower for PsJN in Ca and Mg content, respectively) and roots (23% and 25% lower for both RU1 and PsJN in Ca and Mg content, respectively).

Shoot Fe content was significantly lower in bacterial inoculated plants than non-inoculated control under both non-stressed (32% and 33% lower for RU1 and PsJN, respectively) and salinity conditions (35% and 73% lower for RU1 and PsJN, respectively) (Table 3). PsJN-inoculated plants had significantly lower root Fe content than the non-inoculated plants under both non-stressed (35% lower) and salinity conditions (39% lower), while the difference in root Fe content between RU1 inoculated plants and the non-inoculated control was not significant. Al content of both shoots and roots were significantly lower in both RU1 (68% and 27% for shoots and roots, respectively) and PsJN (30% and 36% for shoots and roots, respectively) treated plants than those in the non-inoculated control under salinity condition. Under non-stressed conditions, shoot Al content of RU1 inoculated plants was significant lower (25%) than that of the non-inoculated control; root Al content of PsJN-inoculated plants was significant lower (23%) than that of the non-inoculated control (Table 3). Bacterial inoculation had no significant effects on Mn and Zn content in roots. Shoot Mn content was significantly lower (29%) in PsJN-inoculated plants compared to the non-inoculated plants under non-stressed condition. Shoot Zn content was significantly lower in both bacterial inoculations (34% and 33% lower for RU1 and PsJN, respectively) under non-stressed condition and in RU1-inoculated plants (26%) under salinity condition compared to the non-inoculated plants (Table 3).

TABLE 2

Content of K and Na content, and K/Na ratio in shoots and roots of perennial rye plants under non- stressed or salinity treatment. Values are means of four replicates. Values with the same letter within each column indicated no significant difference based on LSD test at p = 0.05.

| Treatment | | | K (%) | Na (%) | K/Na |
|---|---|---|---|---|---|
| Shoot | Water | Control | $1.36^b$ | $0.08^a$ | $16.87^b$ |
| | | PsJN | $1.73^a$ | $0.05^b$ | $37.39^a$ |
| | | RU1 | $1.91^a$ | $0.04^b$ | $45.33^a$ |
| | Salinity | Control | $1.07^b$ | $3.98^a$ | $0.27^b$ |
| | | PsJN | $1.57^a$ | $1.81^b$ | $0.88^a$ |
| | | RU1 | $1.65^a$ | $0.93^c$ | $1.81^a$ |
| Root | Water | Control | $1.76^a$ | $0.14^b$ | $12.68^a$ |
| | | PsJN | $1.88^a$ | $0.17^a$ | $11.63^a$ |
| | | RU1 | $1.30^b$ | $0.15^{ab}$ | $8.78^b$ |
| | Salinity | Control | $1.38^b$ | $0.38^a$ | $3.68^{ab}$ |
| | | PsJN | $2.00^a$ | $0.48^a$ | $4.22^a$ |
| | | RU1 | $1.34^b$ | $0.39^a$ | $3.40^b$ |

TABLE 3

Mineral nutrient content in shoots and roots of perennial rye plants under non-stressed or salinity treatment. Values are means of four replicates. Values with the same letter within each column indicated no significant difference based on LSD test at p = 0.05.

| | Treatment | | N % | P % | Ca % | Mg % | Mn ppm | Fe ppm | Al ppm | Zn ppm |
|---|---|---|---|---|---|---|---|---|---|---|
| Shoot | Water | Control | $1.39^b$ | $0.24^a$ | $0.49^a$ | $0.23^a$ | $967.09^a$ | $1088.07^a$ | $873.44^a$ | $31.15^a$ |
| | | PsJN | $1.60^a$ | $0.25^a$ | $0.48^a$ | $0.23^a$ | $685.76^b$ | $726.93^b$ | $703.19^{ab}$ | $20.85^b$ |
| | | RU1 | $1.58^a$ | $0.29^a$ | $0.45^a$ | $0.23^a$ | $809.68^{ab}$ | $743.68^b$ | $654.86^b$ | $20.67^b$ |
| | Salinity | Control | $1.35^b$ | $0.28^a$ | $0.71^a$ | $0.28^a$ | $801.54^a$ | $1428.26^a$ | $1162.96^a$ | $30.06^a$ |
| | | PsJN | $1.62^a$ | $0.26^a$ | $0.55^b$ | $0.24^b$ | $638.53^a$ | $935.33^b$ | $808.75^b$ | $24.08^{ab}$ |
| | | RU1 | $1.63^a$ | $0.28^a$ | $0.49^b$ | $0.21^b$ | $609.63^a$ | $381.06^c$ | $368.29^c$ | $22.37^b$ |
| Root | Water | Control | $0.74^c$ | $0.24^a$ | $0.22^a$ | $0.12^a$ | $569.20^a$ | $3550.47^a$ | $3480.78^a$ | $42.16^a$ |
| | | PsJN | $0.90^a$ | $0.25^a$ | $0.25^a$ | $0.11^b$ | $514.53^a$ | $2296.84^b$ | $2690.81^b$ | $44.36^a$ |
| | | RU1 | $0.83^b$ | $0.25^a$ | $0.26^a$ | $0.12^a$ | $547.99^a$ | $3009.21^a$ | $3527.91^a$ | $46.24^a$ |
| | Salinity | Control | $0.71^b$ | $0.24^a$ | $0.34^a$ | $0.16^a$ | $709.96^a$ | $4053.75^a$ | $4454.38^a$ | $44.68^a$ |
| | | PsJN | $0.87^a$ | $0.17^a$ | $0.26^b$ | $0.12^b$ | $485.61^a$ | $2485.11^b$ | $2837.24^b$ | $32.71^a$ |
| | | RU1 | $0.83^a$ | $0.19^a$ | $0.26^b$ | $0.12^b$ | $504.33^a$ | $2785.37^{ab}$ | $3238.48^b$ | $38.08^a$ |

Finally, it certain instances it will be beneficial to increase ACC deaminase production in the species utilized to enhance plant growth. For example, bacterial ACC deaminase activity is induced using the following protocol. Bacterial isolates were first revived by adding 10 μL −80° C. stored suspension into 1 mL LB broth and incubated at 28° C. and 150 rpm for 48 h. Bacterial cells were then collected by centrifuging at 8000 g for 5 min. The supernatants were discarded and the pellet was washed twice in 1 mL 0.1 M Tris-HCl (pH=7.5) buffer. The cells were re-suspended in 1 mL DF minimum medium with 3 mM ACC as the sole nitrogen source, and incubated at 28° C. and 150 rpm for 24 h to induce ACC deaminase activity. Bacterial cells are then harvested and washed, before applying to the plant.

Discussion

As discussed above, increased ethylene production under stress conditions can be detrimental to plant growth. We demonstrate herein that perennial ryegrass produced higher content of ACC under salinity stress than those under non-stressed conditions. The bacterial inoculated perennial ryegrass showed significantly lower ACC content in both root tissues and shoot tissues, suggesting that ACC-deaminase producing bacteria suppressed ACC accumulation in plant tissues. Siddikee et al. (2012) found red pepper (*Capsicum annuum* L.) seedlings inoculated by ACC-deaminase producing bacteria showed significant reduction in levels of ACC under salinity conditions. Other related studies which measured ethylene production rate instead of ACC content also found that ACC-deaminase producing bacteria decreased ethylene production and improved stress tolerance (Grichko and Glick, 2001; Mayak et al., 2004; Siddikee et al., 2011). These results suggested that ACC-deaminase producing bacteria could effectively reduce stress-induced ACC accumulation, which likely contribute to their positive growth and physiological effects on improving salinity tolerance in perennial ryegrass.

Plants inoculated with *Burkholderia phytofirmans* PsJN or *B. gladioli* RU1 also showed an increase in turf quality, tiller formation and shoot biomass, indicating both ACC-deaminase bacterial strains could improve shoot growth of perennial ryegrass through the bacterial hydrolysis of ACC. In addition, a more extensive root system was observed for plants inoculated with either bacterial species under non-stressed conditions, with higher total root length and root volume although root diameter was not affected. Root growth promotion effects were also observed under salinity conditions in plants inoculated with RU1. This is consistent with the previous reports of increased root length and surface area in other plant species by inoculating ACC-deaminase producing bacteria under salinity conditions (Gamalero et al., 2010; Siddikee et al., 2011; Siddikee et al., 2012; Bal et al., 2013). This better developed root system could enhance water and nutrient uptake under stress conditions.

Physiological analyses, measured as RWC, EL, and Fv/Fm, indicated that the inoculation of perennial ryegrass with PsJN or RU1 may also help to maintain better cellular hydration and membrane stability, and greater photochemical efficiency under salinity stress. The increased RWC by PGPB under salinity stress has also been reported in maize (Nadeem et al., 2007), wheat (Nadeem et al., 2010) and mung bean (*Vigna radiata*) (Ahmad et al., 2013). Mayak et al. (2004) reported increased water use efficiency of PGPB-inoculated plants. Naveed et al. (2014) also reported an increase of Fv/Fm in PGPB inoculated maize under normal growth conditions. Lowering EL has also been reported in PGPB inoculated peanut (*Arachis hypogaea* L.) under salinity by Shukla et al. (2012). Our results suggested that the reduction in ACC content and thus the subsequent decrease in ethylene accumulation under salinity stress through ACC-deaminase bacteria may have promoted physiological tolerance of perennial ryegrass to salinity stress.

Maintaining ion homeostasis, such as increasing K+/Na+ ratio, can detoxify the adverse effects of Na+ accumulation in plants exposed to salinity stress (Hamdia et al., 2004). Na+ uptake competes with K+ acquisition due to their physicochemical similarities in plants (Maathuis and Amtmann, 1999). The accumulation of K+ is critical for plant tolerance to salinity stress by balancing the osmotic stress due to the accumulation of Na+ in cytosol or vacuoles to maintain cell turgor and exclude Na+ from entering into cells exposed to salt stress (Maathuis and Amtmann, 1999). Mayak et al. (2004) reported that the main effect of the ACC-deaminase producing PGPB inoculation was an increase in the uptake of K, which plays an important role in balancing osmotic potential of the vacuole (Hu et al., 2011). Nadeem et al. (2007, 2010) also reported a higher K+/Na+ ratio in ACC-deaminase producing PGPB inoculated maize and wheat under salinity stress. In our study, inoculated perennial ryegrass with either bacterial strain had a significant higher K+/Na+ ratio in shoot tissues under both non-stressed and salinity conditions. In addition, salinity caused increases in shoot and root Na content but shoot Na content was lower in bacterial inoculated plants compared to that in non-inoculated plants; root Na content did not differ between the inoculated and the non-inoculated plants. These results indicated that the ACC-deaminase bacteria may affect shoot exclusion or extrusion of Na+ and help to maintain K+ and Na+ balance to minimize the toxic effects of Na+. However, the mechanisms of how lowered ACC production in plant tissues by ACC-deaminase bacteria affect Na accumulation and K balance are not clear, which deserves further investigation.

The content of other macronutrients, including N, Ca, and Mg were also altered by the bacterial inoculation in addition to changes in Na and K content. The ACC-deaminase bacterial inoculation also increased N content in shoots and roots. The increased K and N content could be due to increased root growth for nutrient uptake, which was also reflected in the increased turf quality. In contrast to K and N, the content of Ca and Mg decreased with bacterial inoculation, although the lower level of Ca or Mg were not decreased enough causing deficient symptoms. The underlying factors for the suppression Ca and Mg accumulation by the inoculation of ACC-deaminase bacteria are unknown, despite their positive effects on improving salinity tolerance.

For micronutrients, excessive accumulation of Fe, Al, Mn, and Zn can be detrimental to plant growth: excess Fe could inhibit the uptake of other nutrients such as P and K; excess Al could interfere root cell division, decrease P availability and root respiration; excess Mn could result in root growth inhibition; excess Zn could show negative effects on mineral nutrition and enzyme activities (Foy et al., 1978). The sufficient ranges of different nutrient elements vary with plant species and soil and their environmental conditions, but it is typical within 97-934, 30-73, and 14-64 for Fe, Al, Mn, and Zn, respectively in perennial ryegrass (Mills and Jones, 1996). In this study, plants inoculated with ACC-deaminase bacteria had accumulated lower amounts of Fe, Mn, Zn, and Al, suggesting that they may have beneficial roles for plant growth under salinity stress by lowering the potential toxic effects of those micronutrients.

In summary, the positive effects of ACC-deaminase producing bacterial inoculation on the growth and salinity tolerance of perennial ryegrass widely used as turfgrass species has been shown. The reduction in ACC accumulation in perennial ryegrass plants observed after inoculation with ACC-deaminase producing PGPB is likely correlated with reduced ethylene production which in turn reduces salinity stress. Accordingly, ACC-deaminase producing PGPB are useful for turfgrass establishment and maintenance in salt-affected areas.

References for Example I

Abeles, F. B., Morgan, P. W., and Saltveit Jr, M. E. 2012. Ethylene in plant biology. Academic press, San Diego, Calif.

Ahmad, M., Zahir, Z. A., Khalid, M., Nazli, F., and Arshad, M. 2013. Efficacy of *Rhizobium* and *Pseudomonas* species to improve physiology, ionic balance and quality of mung bean under salt-affected conditions on farmer's fields. Plant Physiology and Biochemistry 63:170-176.

Alshammary, S. F., Qian, Y. L., and Wallner, S. J. 2004. Growth response of four turfgrass species to salinity. Agricultural water management 66(2):97-111.

Arbona, V., Flors, V., Jacas, J., García-Agustín, P., and Gómez-Cadenas, A. 2003. Enzymatic and non-enzymatic antioxidant responses of Carrizo citrange, a salt-sensitive citrus rootstock, to different levels of salinity. Plant and cell physiology 44(4):388-394.

Bal, H. B., Nayak, L., Das, S., and Adhya, T. K. 2013. Isolation of ACC deaminase producing PGPR from rice rhizosphere and evaluating their plant growth promoting activity under salt stress. Plant and soil 366(1-2):93-105.

Barrs, H. D., and Weatherley, P. E. 1962. A re-examination of the relative turgidity technique for estimating water deficits in leaves. Australian Journal of Biological Sciences 15(3):413-428.

Beard, J. B. Turfgrass science and culture. 1973. Englewood Cliffs, N.J.

Blum, A., and Ebercon, A. 1981. Cell membrane stability as a measure of drought and heat tolerance in wheat. Crop Science 21(1):43-47.

Carrow, R. N., and Duncan, R. R. 1998. Salt-affected turfgrass sites: Assessment and management. John Wiley and Sons, New York.

Cheng, Z., Park, E., and Glick, B. R. 2007. 1-Aminocyclopropane-1-carboxylate deaminase from *Pseudomonas putida* UW4 facilitates the growth of canola in the presence of salt. Canadian journal of microbiology 53(7):912-918.

Concepcion, M., Lizada, C., and Yang, S. F. 1979. A simple and sensitive assay for 1-aminocyclopropane-1-carboxylic acid. Analytical biochemistry 100(1):140-145.

Foy, C. D., Chaney, R. T., and White, M. C. 1978. The physiology of metal toxicity in plants. Annual Review of Plant Physiology 29(1):511-566.

Gamalero, E., Berta, G., Massa, N., Glick, B. R., and Lingua, G. 2010. Interactions between *Pseudomonas putida* UW4 and *Gigaspora rosea* BEGS and their consequences for the growth of cucumber under salt-stress conditions. Journal of applied microbiology 108(1):236-245.

Ghanem, M. E., Albacete, A., Martínez-Andújar, C., Acosta, M., Romero-Aranda, R., Dodd, I. C., Lutss, S., and Pérez-Alfocea, F. 2008. Hormonal changes during salinity-induced leaf senescence in tomato (*Solanum lycopersicum* L.). Journal of Experimental Botany 59(11):3039-3050.

Glick, B. R. 1995. The enhancement of plant growth by free-living bacteria. Canadian Journal of Microbiology 41(2):109-117.

Glick, B. R., and Bashan, Y. 1997. Genetic manipulation of plant growth-promoting bacteria to enhance biocontrol of phytopathogens. Biotechnology Advances, 15(2), 353-378.

Glick, B. R. 2004. Bacterial ACC deaminase and the alleviation of plant stress. Advances in applied microbiology 56:291-312.

Glick, B. R. 2012. Plant growth-promoting bacteria: mechanisms and applications. Scientifica (Cairo) 2012, 963401.

Gómez-Cadenas, A., Tadeo, F. R., Primo-Millo, E., and Talon, M. 1998. Involvement of abscisic acid and ethylene in the responses of citrus seedlings to salt shock. Physiologia *Plantarum* 103(4):475-484.

Grichko, V. P., and Glick, B. R. 2001. Amelioration of flooding stress by ACC deaminase-containing plant growth-promoting bacteria. Plant Physiology and Biochemistry 39(1):11-17.

Hamdia, M. A. E. S., Shaddad, M. A. K., and Doaa, M. M. 2004. Mechanisms of salt tolerance and interactive effects of *Azospirillum brasilense* inoculation on maize cultivars grown under salt stress conditions. Plant Growth Regulation 44(2):165-174.

Hoagland, D. R., and Arnon, D. I. 1950. The water-culture method for growing plants without soil. California Agric. Exp. Circ. 347.

Horneck, D. A., and Miller, R. O. 1998. Determination of total nitrogen in plant tissue. In: Y. P. Karla, editor, Handbook of reference methods for plant analysis. CRC Press, Boca Raton, Fla. p. 75-83.

Hu, T., Li, H. Y., Zhang, X. Z., Luo, H. J., and Fu, J. M. 2011. Toxic effect of NaCl on ion metabolism, antioxidative enzymes and gene expression of perennial ryegrass. Ecotoxicology and environmental safety 74(7):2050-2056.

Kukreja, S., Nandwal, A. S., Kumar, N., Sharma, S. K., Unvi, V., and Sharma, P. K. 2005. Plant water status, $H_2O_2$ scavenging enzymes, ethylene evolution and membrane integrity of *Cicer arietinum* roots as affected by salinity. Biologia Plantarum 49(2):305-308.

Lowman, J. S., Lava-Chavez, A., Kim-Dura, S., Flinn, B., Nowak, J., and Mei, C. 2014. Switchgrass Field Performance on Two Soils as Affected by Bacterization of Seedlings with *Burkholderia phytofirmans* Strain PsJN. BioEnergy Research 1-10.

Maathuis, F. J., and Amtmann, A. N. N. A. 1999. K+ nutrition and Na+ toxicity: the basis of cellular K+/Na+ ratios. Annals of Botany 84(2):123-133.

Martinez-Beltran, J., and Manzur, C. L. 2005. Overview of salinity problems in the world and FAO strategies to address the problem. In: Proceedings of the international salinity forum, Riverside, Calif. p. 311-313.

Mayak, S., Tirosh, T., and Glick, B. R. 2004. Plant growth-promoting bacteria confer resistance in tomato plants to salt stress. Plant Physiology and Biochemistry 42(6):565-572.

Miller, R. O. 1998. High-temperature oxidation: dry ashing. In: Y. P. Karla, editor, Handbook and reference methods for plant analysis. CRC Press, Boca Raton, Fla. p. 53-56.

Mills, H. A., Jones, J. B., and Wolf, B. 1996. Plant analysis handbook II: A practical sampling, preparation, analysis, and interpretation guide. MicroMacro Publishing, Athens, Ga.

Mitter, B., Petric, A.; Chain, P. S., Trognitz, F., Nowak, J., Compant, S., and Sessitsch, A. 2013. Genome analysis, ecology, and plant growth promotion of the endophyte *Burkholderia phytofirmans* strain PsJN. Molecular microbial ecology of the rhizosphere 1:865-874.

Miyamoto, S., and Chacon, A. 2006. Soil salinity of urban turf areas irrigated with saline water: II. Soil factors. Landscape and urban planning 77(1):28-38.

Morgan, P. W., and Drew, M. C. 1997. Ethylene and plant responses to stress. Physiologia Plantarum 100(3):620-630.

Nadeem, S. M., Zahir, Z. A., Naveed, M., and Arshad, M. 2007. Preliminary investigations on inducing salt tolerance in maize through inoculation with rhizobacteria containing ACC deaminase activity. Canadian journal of microbiology 53(10):1141-1149.

Nadeem, S. M., Zahir, Z. A., Naveed, M., Asghar, H. N., and Arshad, M. 2010. Rhizobacteria capable of producing ACC-deaminase may mitigate salt stress in wheat. Soil Science Society of America Journal 74(2):533-542.

Naveed, M., Mitter, B., Yousaf, S., Pastar, M., Afzal, M., and Sessitsch, A. 2014. The endophyte *Enterobacter* sp. FD17: a maize growth enhancer selected based on rigorous testing of plant beneficial traits and colonization characteristics. Biology and fertility of soils 50(2):249-262.

Penrose, D. M., Moffatt, B. A., and Glick, B. R. 2001. Determination of 1-aminocycopropane-1-carboxylic acid (ACC) to assess the effects of ACC deaminase-containing bacteria on roots of canola seedlings. Canadian Journal of Microbiology 47(1):77-80.

Pessarakli, M. 1999. Handbook of plant and crop stress. CRC Press, New York.

Saleem, M., Arshad, M., Hussain, S., and Bhatti, A. S. 2007. Perspective of plant growth promoting rhizobacteria (PGPR) containing ACC deaminase in stress agriculture. Journal of industrial microbiology and biotechnology 34(10):635-648.

Yang, J., Kloepper, J. W., and Ryu, C. M. 2009. Rhizosphere bacteria help plants tolerate abiotic stress. Trends in plant science 14(1):1-4.

Sergeeva, E., Shah, S., and Glick, B. R. 2006. Growth of transgenic canola (*Brassica napus* cv. Westar) expressing a bacterial 1-aminocyclopropane-1-carboxylate (ACC) deaminase gene on high contents of salt. World Journal of Microbiology and Biotechnology 22(3):277-282.

Shaharoona, B., Arshad, M., and Zahir, Z. A. 2006. Effect of plant growth promoting rhizobacteria containing ACC-deaminase on maize (*Zea mays* L.) growth under axenic conditions and on nodulation in mung bean (*Vigna radiata* L.). Letters in applied microbiology 42(2):155-159.

Shaharoona, B., Jamro, G. M., Zahir, Z. A., Arshad, M., and Memon, K. S. 2007. Effectiveness of Various *Pseudomonas* spp. and *Burkholderia caryophylli* Containing ACC-Deaminase for Improving Growth and Yield of Wheat (*Triticum aestivum* I.). Journal of microbiology and biotechnology 17(8):1300.

Shukla, P. S., Agarwal, P. K., and Jha, B. 2012. Improved salinity tolerance of *Arachis hypogaea* (L.) by the interaction of halotolerant plant-growth-promoting rhizobacteria. Journal of Plant Growth Regulation 31(2):195-206.

Siddikee, M. A., Glick, B. R., Chauhan, P. S., and Sa, T. 2011. Enhancement of growth and salt tolerance of red pepper seedlings (*Capsicum annuum* L.) by regulating stress ethylene synthesis with halotolerant bacteria containing 1-aminocyclopropane-1-carboxylic acid deaminase activity. Plant Physiology and Biochemistry 49(4):427-434.

Siddikee, M. A., Chauhan, P. S., and Sa, T. 2012. Regulation of ethylene biosynthesis under salt stress in red pepper (*Capsicum annuum* L.) by 1-aminocyclopropane-1-carboxylic acid (ACC) deaminase-producing halotolerant bacteria. Journal of Plant Growth Regulation 31(2):265-272.

Upadhyaya, H. D., Wang, Y. H., Sharma, S., Singh, S., and Hasenstein, K. H. 2012. SSR markers linked to kernel weight and tiller number in sorghum identified by association mapping. Euphytica 187(3):401-410.

Watkins, C. B., and Frenkel, C. 1987. Inhibition of pear fruit ripening by mannose. Plant physiology 85(1):56-61.

Zahir, Z. A., Ghani, U., Naveed, M., Nadeem, S. M., and Asghar, H. N. 2009. Comparative effectiveness of *Pseudomonas* and *Serratia* sp. containing ACC-deaminase for improving growth and yield of wheat (*Triticum aestivum* L.) under salt-stressed conditions. Archives of microbiology 191(5):415-424.

Zapata, P. J., Serrano, M., Pretel, M. T., Amorós, A., and Botella, M. 2004. Polyamines and ethylene changes during germination of different plant species under salinity. Plant Science 167(4):781-788.

Example II

The data presented in Example I demonstrate that selected endophytic bacterial colonization of turfgrass plants promotes growth and resistance to environmental challenges. Given these results, a variety of beneficial non-ACC-deaminase producing bacteria can be genetically engineered with suitable bacterial expression vectors to express the ACC-deaminase gene.

Both integrating and non-integrating plasmid vectors can be employed for this process. These can insert exogenous DNA into the host strains chromosome by homologous recombination or remain as replicons. The ACC deaminase gene, which is required to synthesize ACC deaminase in bacteria, will be isolated from *Herbaspirillum rhizosphaerae* and cloned into these plasmids. This gene will be obtained by PCR from the bacteria. Chromosomal integration mediated by the integrating plasmid will be carried out following established procedures (1).

Once generated, transformation of bacteria with the integrating and non-integrating plasmids will be performed following established procedures (2). Bacteriophage vectors will also be employed as described (3).

As mentioned above, a variety of beneficial, non-ACC deaminase producing bacteria are available for genetic engineering. These include particularly, but are not limited to, the species listed below.

*Bacillus laterosporus*: CM-3 (ATCC® PTA-3593™)
*Bacillus chitinosporus* (ATCC® 19986™)
*Bacillus coagulans* Hammer (ATCC® 7050™)
*Bacillus firmus* Bredemann and Werner (ATCC® 17060™)
*Bacillus megaterium* de Bary (ATCC® 15046™)
*Bacillus licheniformis* (Weigmann) Chester (ATCC® 21424™)
*Brevibacillus parabrevis* (ATCC® 10027™)
*Bacillus polymyxa* (Prazmowski) Ash et al. (ATCC® 39564™)
*Bacillus thuringiensis* Berliner (ATCC® 55173™)
*Lysinibacillus sphaericus* (ATCC® 12488™)
*Paenibacillus macerans* (Schardinger) Ash et al. (ATCC® 8509™)
*Azospirillum brasilense* Tarrand et al. (ATCC® 29729™)
*Azospirillum lipoferum* (Beijerinck) Tarrand et al. (ATCC® 29707™)
*Pseudomonas fluorescens* Migula (ATCC® 21637™)
*Pantoea agglomerans* (Beijerinck) Gavini et al. (ATCC® 31420™)
*Rhizobium leguminosarum* Jordan (ATCC® 53912™)
*Ensifer meliloti* (Dangeard) Young (ATCC® 51124™)
*Arthrobacter ureafaciens* (Krebs and Eggleston) Clark (ATCC® 21124™)
*Phyllobacterium myrsinacearum* Knosel (ATCC® 43590™)
*Rhodococcus erythropolis* P1B2 (ATCC® PTA-6648™)

We will next assay the ability of these recombinant bacteria to enhance growth and confer stress resistance to drought and salinity conditions. Growth assays, ACC deaminase activity, ACC concentration determination, visual evaluation of turf quality (TQ), and quantification of relative water content, electrolyte leakage, root length and root and shoot dry weight will be performed. Recombinant bacteria that exhibit these features are also encompassed by the present invention.

References for Example II

Cunningham F. X., Gantt E. Genes and enzymes of carotenoid biosynthesis in plants. Annu Rev Plant Physiol Plant Mol Biol. 1998; 49: 557-83.
Froger, A. and Hall, J. E. Transformation of Plasmid DNA into *E. coli* Using the Heat Shock Method. J Vis Exp. 2007; 6: 253.
Herrington, M. B., Takahashi, I. Bacteriophage transformation of PBS2 in *Bacillus subtilis*. 1975, JV; 15(1) 16-21.

Example III

Liquid Formulation of the BioFertilizer for Seed Coating

This example provides a liquid formulation of biofertilizer, where the formulation consists of two separate solutions that are combined before use as a seed coating.

For the first solution, the bacteria are grown in a 1 L flask using an adequate medium and are concentrated by centrifugation in order to separate the solid. This solid is then suspended in a minimum amount of media. A sun protecting product, such as Congo red or green colorant can also be added to the media at 1% (w/v).

According to one preferred embodiment, at least one of the following bacteria selected from *Burkholderia phytofirman, Burkholderia gladioli, Herbaspirillum huttiense, Burkholderia phenazinium, Burkholderia cepacia*, or *Herbaspirillum rhizosphaerae* is used for the first solution in similar initial concentrations. In another embodiment, the first solution contains a mixture of *Burkholderia phytofirman, Burkholderia gladioli, Herbaspirillum huttiense, Burkholderia phenazinium, Burkholderia cepacia*, and *Herbaspirillum rhizosphaerae*.

For the second solution, a 1% (w/v) solution of a polysaccharide, such as guar gum, gelan gum, pectin, carboxymetil cellulose, agar-agar, xantan gum (or other food hydrocolloid) was prepared to be used as sticker. The two solutions are then mixed together to treat plant seeds as a coating. The seed should be dried before planting and it is preferable to wait at least two hours after application prior to planting.

Example IV

Solid State Formulation of the Biofertilizer of the Invention

This example provides a liquid formulation of a biofertilizer where the bacteria are encapsulated and the fertilizer is in solid form. Alginate beads were prepared as follows:

1 ml of 30% glycerol is added to 1, 1.5 or 2% sodium alginate solution, depending on the alginate properties (M/G ratio) to obtain a final volume of 25 ml. Then, 250 ml of culture (obtained from one or more cultures of *Burkholderia phytofirman, Burkholderia gladioli, Herbaspirillum huttiense, Burkholderia phenazinium, Burkholderia cepacia*, or *Herbaspirillum rhizosphaerae* only or a mixture of *Burkholderia phytofirman, Burkholderia gladioli, Herbaspirillum huttiense, Burkholderia phenazinium, Burkholderia cepacia*, and *Herbaspirillum rhizosphaerae*) is centrifuged, the cell pellet washed with saline (0.85% NaCl, w/v) and suspended in 25 ml of alginate mixture and mixed thoroughly. This suspension is added drop wise into a pre-cooled sterile 1.5 or 2% (w/v) aqueous solution of $CaCl_2$ under mild agitation to obtain the bacterial-alginate beads. These beads were allowed to harden for 2-4 h at room temperature. Beads were collected by sieving and were washed several times with sterile water and stored at 4° C. In order to preserve the formulation the fresh wet beads can be frozen at −80° C. prior to lyophilization at −45° C. for 15 h. The lyophilized dry beads can be stored in sterile glass bottles.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A biofertilizer composition comprising an effective amount of *Burkholderia gladioli* (RU1) bacteria (ATCC Accession No:PTA-126852) for promoting plant growth, enhancing resistance to abiotic stresses and increasing root surface area under salinity stress conditions, wherein said bacteria are in an adhesive polysaccharide solution comprising guar gum, gellan gum, pectin, carboxymethylcellulose, agar, xanthan gum or other food hydrocolloid, are in a solution comprising a sun protecting agent, or are encapsulated in alginate beads.

2. The biofertilizer composition of claim 1, wherein the composition further contains a mixture of one or more ACC deaminase expressing bacteria in equal concentrations, said bacteria being selected from the group consisting of *Herbaspirillum huttiense* (PP19) (ATCC Accession No:PTA-126848), and *Herbaspirillum rhizosphaerae* (PP6) (ATCC Accession No:PTA-126851).

3. The biofertilizer composition of claim 2, wherein the bacterial strains are encapsulated in alginate beads.

4. The biofertilizer composition of claim 2, wherein the biofertilizer is applicable to edible and non-edible plants.

5. The biofertilizer composition of claim 2, wherein said bacteria are present in a culture suspension.

6. The biofertilizer composition of claim 5, wherein the polysaccharide solution contains 1% w/v of a polysaccharide selected from the group consisting of guar gum, gellan gum, pectin, carboxymethylcellulose, agar, and xanthan gum.

7. Turfgrass seeds coated with a biofertilizer composition as claimed in claim 5, said biofertilizer improving germination of said seeds.

8. The biofertilizer composition of claim 1, wherein the polysaccharide solution contains 1% w/v of a polysaccharide selected from the group consisting of guar gum, gellan gum, pectin, carboxymethylcellulose, agar, and xanthan gum.

9. The biofertilizer composition of claim 1 further comprising an equal amount of a *Herbaspirillum*, selected from *Herbaspirillum huttiense* (PP19) (ATCC Accession No:PTA-126848) and *Herbaspirillum rhizosphaerae* (PP6) (ATCC Accession No:PTA-126851).

10. Turfgrass seeds coated with a biofertilizer composition as claimed in claim 1, said biofertilizer improving germination of said seeds.

11. Turfgrass seeds coated with a biofertilizer composition as claimed in claim 9, said biofertilizer improving germination of said seeds.

12. A kit comprising turfgrass seeds and the biofertilizer of claim 5.

13. The kit of claim 12, wherein said turfgrass seeds are from a turfgrass selected from the group consisting of Ryegrass, Kentucky Bluegrass, Tall Fescue, Creeping Bentgrass, Bermuda, St. Augustine and *Zoysia* plant.

14. A method for enhancing growth and resistance to adverse abiotic conditions comprising inoculating a plant or plant seeds with a biofertilizer composition comprising *Burkholderia gladioli* (RU1) (ATCC Accession No:PTA-126852) that expresses ACC deaminase in said plant or plant seeds and increases resistance to abiotic stress relative to uninoculated plants or seeds, said composition comprising at least one of a sun protecting agent and a polysaccharide solution.

15. The method of claim 14, wherein said biofertilizer composition further comprises at least one bacteria selected from the group consisting of *Herbaspirillum huttiense* (PP19(ATCC Accession No:PTA-126848), and *Herbaspirillum rhizosphaerae* (PP6) (ATCC Accession No:PTA-126851).

16. The method of claim 14, wherein said plant is a turfgrass plant selected from the group consisting of Ryegrass, Kentucky Bluegrass, Tall Fescue, Creeping Bentgrass, Bermuda, St. Augustine and *Zoysia* plant, wherein said plant is grown under salinity stress conditions and said biofertilizer composition increases root surface area of the plant.

17. The method of claim 14, wherein said plant or plant seeds comprise turfgrass seeds and the inoculated turf grass seeds are grown in containers.

18. The method of claim 14, wherein said plant or plant seeds comprises turfgrass seeds and turfgrass sod is grown from said turfgrass seeds.

19. The method of claim 14, wherein said composition comprises a polysaccharide solution.

20. A kit for practicing the method of claim 14, comprising turfgrass seeds and vials containing *Burkholderia gladioli* (RU1) (ATCC Accession No:PTA-126852) wherein the *B. gladioli* are in an adhesive polysaccharide solution comprising guar gum, gellan gum, pectin, carboxymethylcellulose, agar, xanthan gum or other food hydrocolloid, are in a solution comprising a sun protecting agent, or are encapsulated in alginate beads, said kit optionally comprising at least one bacteria selected from the group consisting of *Herbaspirillum huttiense* (PP19) (ATCC Accession No:PTA-126848), and *Herbaspirillum rhizosphaerae* (PP6) (ATCC Accession No:PTA-126851).

* * * * *